March 19, 1963  F. L. DAVIS  3,081,663
LOCK PIN WITH PIVOTABLE CAM MEANS AND HAVING
SUBSTANTIALLY 360° HOLDING EFFECT
Filed Feb. 17, 1961
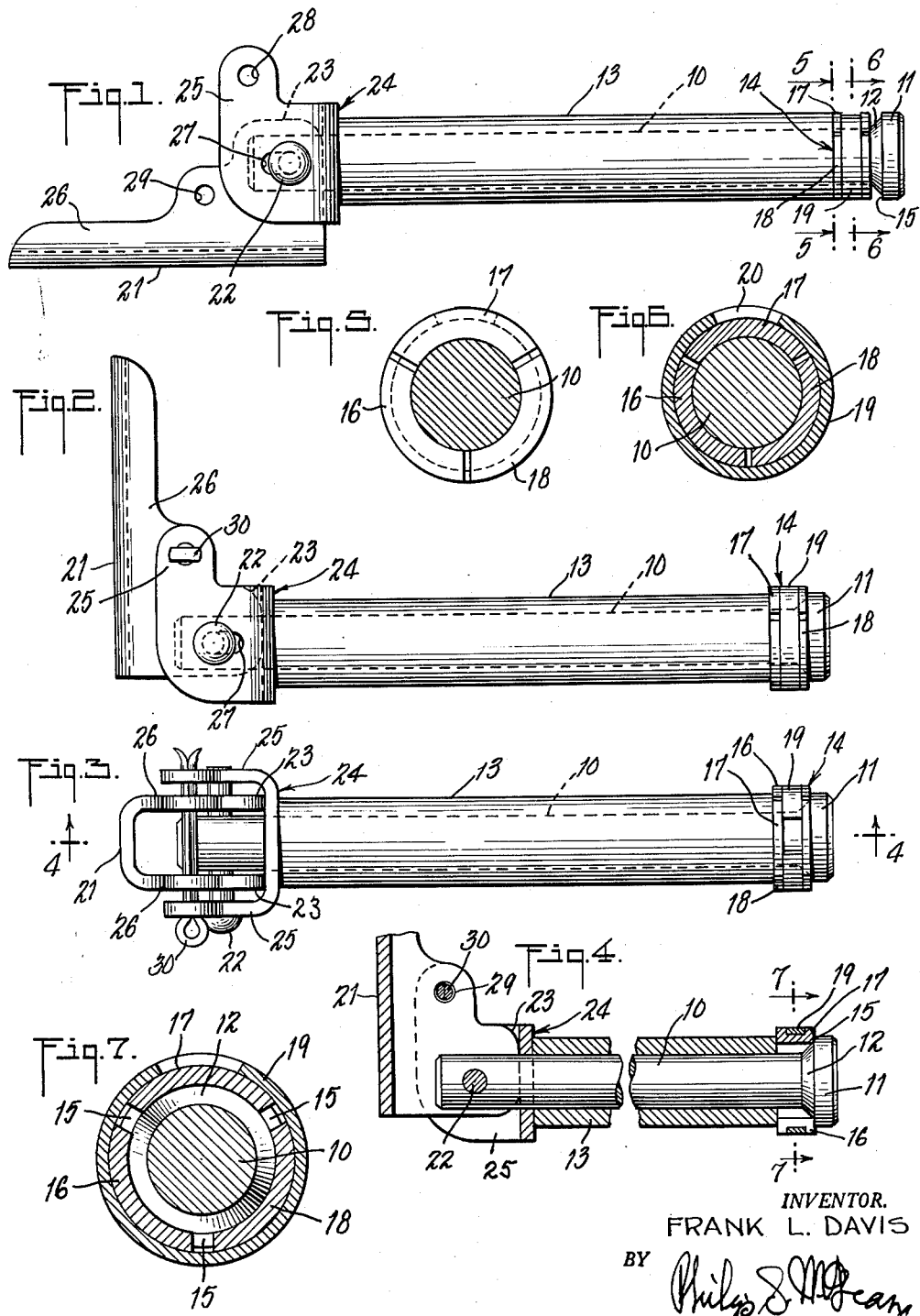
INVENTOR.
FRANK L. DAVIS
BY
ATTORNEY 3,081,663
LOCK PIN WITH PIVOTABLE CAM MEANS AND HAVING SUBSTANTIALLY 360° HOLDING EFFECT
Frank L. Davis, 30 Mariners Lane, Northport, Long Island, N.Y.
Filed Feb. 17, 1961, Ser. No. 90,058
1 Claim. (Cl. 85—5)

The invention herein disclosed relates to fasteners of the lock pin type and the primary object of the invention is to provide a fastener of this character which will have a maximum holding effect.

These fasteners have been made with a transversely shiftable locking slide at the inner end and while they have served their purpose there was the disadvantage of the limited holding effect afforded by such transverse slide.

In the present invention substantially a full 360° holding effect is obtained by using an expansible collar as the locking or holding element and by providing means on the pin by which this collar may be expanded and contracted as required.

Other important novel features of the invention and details of construction and operation are set forth and will appear in the course of the following specification.

The drawing accompanying and forming part of this specification illustrates a present practical embodiment of the invention. Structure however may be modified and changed as regards the immediate illustration, all within the true intent and scope of the invention as hereinafter defined and claimed.

FIG. 1 in the drawing is a side elevation illustrating the lock pin in its contracted condition ready for insertion in an opening in an object to which it is to be attached.

FIG. 2 is a similar view showing the cam lever at the outer end of the pin turned to expand the holding collar at the inner end of the pin and with a cotter pin inserted to secure the operating handle and parts in such relation.

FIG. 3 is a side view of the pin in the expanded, locked condition at a right angle to the position shown in FIG. 2.

FIG. 4 is a broken longitudinal sectional view of the pin in the expanded locked condition, taken on substantially the plane of line 4—4 of FIG. 3.

FIG. 5 is an enlarged cross sectional view on substantially the plane of line 5—5 of FIG. 1 showing particularly the three segments of the expansible holding collar.

FIG. 6 is a similar view on substantially the plane of line 6—6 of FIG. 1, showing in particular the contracting spring engaged about the segments of the holding collar.

FIG. 7 is a cross sectional view taken on line 7—7 of FIG. 4 showing the collar and contracting spring in the expanded condition.

As shown in the several views this lock pin is made up of a central bolt or center pin 10 having an annular enlarged head 11 at the inner end, connected with the body of the bolt by a beveled, conical wedge 12 and a surrounding sleeve 13 by which an expansible and contractible collar 14 can be expanded by forcing it up the incline of the spreader cone or be contracted by allowing it to ride down the slope of this cone.

The enlarged head of the bolt has an abrupt abutment shoulder 15 at the outer termination of the inclined conical ramp which forms the spreader wedge to provide ample support for the expanded collar.

Spring expansive and contractive effect is imparted to the collar by making it in three segments 16, 17, 18 and by surrounding these segments by a flat sphincter spring 19 seated in a groove 20 formed in the three segments.

This spring yields to permit expansive movement of the collar segments when the bolt and sleeve are relatively shifted to force the collar segments up the incline 12, that is from the FIG. 1 to the FIG. 4 position and serves to ride the segments down the incline of the cone when bolt and sleeve are relatively shifted in the opposite direction, that is from the FIG. 4 back to the FIG. 1 position.

The means for relatively shifting bolt and sleeve consists in the present disclosure of a cam lever 21 pivoted on the outer end of the bolt by a cross pin 22 and having a cam formation 23 applying thrust to the outer end of the actuating sleeve 13.

A thrust washer is interposed between the outer end of the sleeve and the cam projections of the lever. This thrust washer 24 is shown as having side extensions or lugs 25, making it a yoke slidably engaged over the outer end of the bolt and the cam lever 21 is shown as having parallel sides 26 disposed within the yoke of the thrust washer and having parallel cam surfaces 23 engaging the washer at opposite sides of the center pin 10.

The parallel sides 25 of the thrust washer yoke are shown as having slots 27 for free passage of the pivot pin 22 permitting free sliding movement of the washer over the center pin resulting from action of the cam lever.

The arms 25 of the washer yoke are shown as perforated at 28 and the sides 26 of the cam lever are shown as having corresponding openings 29 to register with openings 28 when the cam lever is in the collar expanded position, FIGS. 2, 3 and 4, to receive a cotter pin 30, wire or other such safety device.

The complete lock pin consists of but few strong parts and these can be secured together in proper relation by the simple act of assembly. The expansible spring holding collar may first be slipped over the center pin and then after the yoke, which serves as a thrust washer, is located over the outer end of the center pin and the cam lever is located in place it is only necessary to slip the pivot pin 22 through the thrust yoke, cam lever and center pin whereupon the parts will be secured in their proper relation as shown in FIG. 1.

In the contracted condition illustrated in FIG. 1, the lock pin may be inserted in the seat or opening in which it is to be used and it then may be secured and locked in that position by simply turning the cam lever 21 down into the position shown in FIGS. 2 and 3, where it may be locked against accidental release by insertion of the cotter pin 30 or other such element through the registering openings 28 and 29 in the thrust yoke and cam lever.

In the expanded condition illustrated in FIGS. 2, 3 and 4 the spring holding collar 14 is solidly seated on the shoulder 15 of the center pin and provides a substantially complete circumferential abutment for locking the pin in place and capable of carrying any load to which the pin may be subjected.

At the outer end the thrust washer provides a companion opposed shoulder which in cooperation with the holding shoulder of the collar at the inner end of the pin may serve to secure intermediate parts together over the sleeve portion of the pin.

If necessary or desirable washers or other filler or spacer elements may be engaged upon the sleeve in back of the thrust washer 24.

What is claimed is:
A lock pin comprising
an elongated cylindrical bolt having a body and a head at one end provided with an inwardly faced annular abutment shoulder of greater diameter than the bolt diameter and a conical ramp extending from said shoulder down to the body of the bolt,
a radially expansible and contractible segmented abut- ment collar on said bolt of a diameter less than said annular shoulder in the contracted state and expansible by engagement over said conical ramp to greater diameter than said annular shoulder and to project radially beyond the edge of said annular shoulder, the segments of said segmented collar having an annular groove therein, a sphincter spring seated in said groove for contracting said collar over said conically inclined ramp down to the diameter of the body of said bolt, a sleeve longitudinally slidable over the bolt into collar expanding engagement with said collar and movable in the opposite direction to permit contracting movement of the collar over the inclined ramp effected by contraction of the sphincter spring and means at the opposite end of the bolt for effecting sliding movement of said collar expanding sleeve to expand said collar radially beyond the circumference of the sleeve to thereby serve as a substantially complete circumferential abutment at the end of said sleeve, said means including a cam lever having parallel cam forming sides disposed at opposite sides of the bolt and pivoted on said bolt, a thrust washer mounted on the bolt and disposed between said cam forming sides of the cam lever and the adjacent end of said sleeve, said thrust washer having parallel sides projecting from opposite edge portions of the same into position at the outside of said cam forming sides of the cam lever, said cam lever being pivoted on the bolt by a pivot pin extending through said sides of the washer and said sides of the washer having slots for free passage of said pivot pin extending longitudinally of the bolt axis to permit movement of the thrust washer in unison with the sleeve, said cam forming sides of the cam lever and said extended sides of the thrust washer having openings therethrough registering in the collar expanding position of the cam lever for the reception of a safety wire for securing the parts in the collar expanded condition.

References Cited in the file of this patent

UNITED STATES PATENTS

| | | |
|---|---|---|
| 1,212,871 | Abbott | Jan. 16, 1917 |
| 1,922,099 | Kilian | Aug. 15, 1933 |
| 2,377,077 | Gay et al. | May 29, 1945 |
| 2,782,672 | Davis | Feb. 26, 1957 |
| 2,786,383 | Bachman | Mar. 26, 1957 |
| 2,865,076 | Newton et al. | Dec. 23, 1958 |

FOREIGN PATENTS

| | | |
|---|---|---|
| 988,724 | France | Apr. 30, 1951 |
| 663,755 | Great Britain | Dec. 27, 1951 |